United States Patent [19]

Buce

[11] 3,771,599

[45] Nov. 13, 1973

[54] METHOD FOR RESTRICTING FLUID PATHWAYS THROUGH A SUBTERRANEAN FORMATION ZONE

[75] Inventor: Walter F. Buce, Bartlesville, Okla.

[73] Assignee: Phillips Petroleum Company, Bartlesville, Okla.

[22] Filed: July 18, 1972

[21] Appl. No.: 272,963

[52] U.S. Cl. ................................ 166/295, 175/72
[51] Int. Cl. .......................................... E21b 33/138
[58] Field of Search ................... 166/295, 294, 270, 166/300; 175/72; 252/8.5 LC

[56] References Cited
UNITED STATES PATENTS

| | | | |
|---|---|---|---|
| 3,608,639 | 9/1971 | Hart | 166/295 |
| 3,158,210 | 11/1964 | Cannon et al. | 175/72 |
| 3,448,800 | 6/1969 | Parker et al. | 175/72 X |
| 3,467,208 | 9/1969 | Kelly, Jr. | 175/72 |
| 3,568,782 | 3/1971 | Cox | 175/72 |
| 3,150,726 | 9/1964 | Bodine | 166/295 X |
| 3,251,414 | 5/1966 | Willman | 166/295 |
| 3,379,253 | 4/1968 | Chism | 166/295 |
| 3,412,796 | 11/1968 | Dekking | 166/295 |
| 3,603,397 | 9/1971 | Peray | 166/295 X |
| 3,637,019 | 1/1972 | Lee | 166/295 |

Primary Examiner—Stephen J. Novosad
Attorney—James W. Williams et al.

[57] ABSTRACT

This invention resides in a method for restricting fluid pathways through a subterranean formation zone. A polymerizable material capable of forming popcorn polymer is positioned in the formation zone, maintained under polymerization conditions for a time sufficient to polymerize in situ at least a portion of the material and restrict fluid pathways through the zone without exerting a force on the formation which is of greater magnitude than the magnitude required for fracturing the formation zone.

10 Claims, No Drawings

METHOD FOR RESTRICTING FLUID PATHWAYS THROUGH A SUBTERRANEAN FORMATION ZONE

This invention resides in a method for restricting fluid pathways through a formation. A polymerizable material capable of forming hard, porous, relatively insoluble popcorn polymer is placed in the formation and there maintained under polymerization conditions for a time sufficient to polymerize in situ at least a portion of the material and restrict fluid pathways through the zone without exerting a force on the formation zone of a magnitude sufficient for fracturing the formation zone.

Heretofore methods of preventing lost circulation in a formation zone during drilling operations, for example, involve pumping loss circulation material into the zone. These materials were wedged into the pores and indices of the formation with fluid pressure. In large pathways, these methods were often unsuccessful owing to the fact that the material could not be maintained at their desired location. Various polymers have been found which can be polymerized in situ for reducing the fluid pathways. These heretofore utilized polymers sometimes failed owing to the fact that portions of the polymer plug would be washed from their locus by the high formation pressure and movement of the polymer portion by fluids passing under sometimes high volocity passing in contact with the polymer. Where the void desired to be restricted or sealed is large relative to the pores of the formation, for example vuggy formations, fractured strata, or cavernous carbonaceous materials, the problem of effectively restricting fluid flow through zones of the formation is made exceedingly more difficult.

By the method of this invention, a polymerizable material capable of forming hard, porous relatively insoluble popcorn polymers is placed in the formation zone desired to be sealed. The material is there maintained under polymerization conditions for a time sufficient to polymerize in situ at least a portion of the material and restrict fluid pathways through the zone without exerting a force on the formation zone of a magnitude sufficient for fracturing the formation zone.

As known in the art, the amount of material utilized is a function of the physical properties of the formation zone and the radial extent from the well bore that is desired to be sealed. These variables are routinely calculated by one skilled in the art from data of the formation zone such as core analysis, well logs, and other analytical methods and procedures.

Although the instant invention is primarily directed to sealing or restricting the fluid pathways through a subterranean formation zone adjacent a well bore, it should be understood that this invention can be utilized in other conditions and situations.

Where the zone desired to be sealed is adjacent a well bore, the polymerizable material is pumped from the surface downwardly through the well bore and outwardly through the formation from the well bore. Any of the many procedures for selectively positioning the material in the desired zone can be utilized such as, for example, straddle packers, etc.

The time necessary for polymerizing a preselected concentration of the polymerizable material to restrict the fluid pathways without exerting a force on the formation zone of a magnitude sufficient for fracturing the matrix of the formation zone is also dependent upon the variables of the formation physical properties, characteristics, temperatures, pressures, and the fluids contained therein. Once these conditions are known by analysis as heretofore described, one skilled in the art can easily determine the popcorn polymer growth that is desired under the in situ conditions for maintaining the forces exerted by the polymer below the magnitude of the forces which will fracture the formation.

Popcorn polymer is sometimes referred to as cauliflower, sponge, and Kondakos. Popcorn polymer is a hard, porous opaque material that is not soluble in ordinary solvents. The occurrence of popcorn polymer is well known in chemical plants such as for example a synthetic rubber plant and as described in *Industrial and Engineering Chemistry*, July, 1947, page 830, "Inhibition of Polymerization, Laboratory and Plant Control of Popcorn Polymer Growth" by M. S. Kharasch et al.

Although the formation of popcorn polymer particles or seeds is a relatively slow process, it has been discovered that polymer growth from an existing seed is a very rapid reaction. Therefore it is preferred that popcorn polymer particles or seeds be placed within the formation in order to provide growth with resultant sealing. Regardless of the method of initiating polymer growth within the formation, by forming seeds therein or by initially placing seeds within the formation in contact with monomers, the most remarkable characteristic is the phenomenon of growth which a seed exhibits when in contact with liquid or gaseous monomers. It has also been discovered that when butadiene, styrene, or a mixture of the two, for example, is brought into contact with a popcorn polymer seed, the bulk of the monomers is rapidly converted into a popcorn polymer that is similar in properties to the original seed. Since most all American synthetic-rubber-manufacturing plants, for example, have active popcorn polymer seeds in the operating equipment, it is therefore more convenient and less time consuming to practice the method of this invention by utilizing popcorn polymer seeds as opposed to first producing seeds within the formation and thereafter promoting popcorn polymer growth to produce the desired forces on the formation.

Popcorn polymer growth is somewhat proportional to the peroxide content. For this reason whenever the polymer growth is continued without the addition of new peroxide groups, subsequent growth is less active than preceding growth. It then sometimes becomes necessary to supply additional peroxide groups such as, for example, hydroperoxides, to the polymerizable material within the formation. This is especially true when the voids to be sealed are relatively large. These groups are most readily formed when oxygen attacks methylene groups adjacent aliphatic double bonds. Consequently, the more methylene groups present in the polymerizable material within the formation, the greater will be the rate and resultant growth of the popcorn polymer therein. Examples of materials containing such methylene groups are polybutadiene, copolymers containing considerable butadiene, and others known in the art. Popcorn polymer seeds are known to grow rapidly in not only styrene, butadiene, or mixtures thereof but also in other unsaturated monomers such as, for example, isoprene, methyl-methacrylate.

Since pressure and temperature conditions of various formations vary widely relative to one another and the growth rate of popcorn polymers varies among the polymerizable material types capable of forming the popcorn polymer and the volumes of material utilized, the particular treatment employed depends upon the magnitude of the desired results, the types and volumes of material and the formation conditions where utilized. However, an example treatment to cause restriction of fluid pathways through a formation is as follows:

EXAMPLE I

| | |
|---|---|
| Formation Depth | 5500 feet |
| Formation Temperature | 185°F. |
| Formation Pressure | 2400 psi |
| Formation Type | Vugged limestone, broken |
| In Place Fluid | Brine (10 lbs/gal) |
| Polymerizable Fluid | Butadiene + butadiene popcorn polymer seeds |
| Volume | 500 Gallons + 10 pounds powdered seeds |
| Distance extending from Well Bore | 10 feet |
| Flush Medium Utilized | Crude oil |
| Initial Formation Face Pressure | 110 psi |

After polymerization conditions are maintained for 12 hours the zone of loss circulation is sufficiently sealed to permit continued drilling operations at previously used mud pressures and experiencing normal fluid loss.

It is preferred that in situ polymerized popcorn polymer form a volume of polymer not substantially greater than the total effective porosity of the zone portion desired to be restricted. This will assure sealing of the zone without fracturing the formation which might cause further lost circulation.

In order to further assure sealing of the zone, lost circulation material, as known in the art such as natural and synthetic fibers or materials, can be incorporated in the polymer material subsequent to polymerization thereof. Upon polymerization of the polymer, these fibrous materials will be forcibly urged into indices of the matrix and held firmly at these positions by the formed polymer. Further, these fibers are generally compressible which will aid in preventing fracturing pressure forces from being exerted on the formation during polymer growth.

Where the formation to be sealed is cavernous, badly broken, or contains relatively large fractures, lost circulation material mixed with additional polymerizable polymer can be injected into the zone after polymerization of the popcorn polymer therein. This procedure is recommended where large void areas receive the polymer and relatively small fractures are passing fluid after the popcorn is formed. The in place polymer will thus direct the subsequent polymer-fibers to the yet unsealed portions. These subsequent treatments are generally utilized where a complete, absolute seal is necessary.

Other modifications and alterations of this invention will become apparent to those skilled in the art from the foregoing discussion and example, and it should be understood that this invention is not to be unduly limited thereto.

What is claimed is:

1. A method for restricting fluid pathways through a subterranean formation zone, comprising:

placing in the zone a polymerizable material capable of forming hard, porous, relatively insoluble popcorn polymer; and maintaining said material under polymerzation conditions within the formation for a time sufficient to polymerize in situ at least a portion of the material and restrict fluid pathways through the zone without exerting a force on the zone of a magnitude sufficient for fracturing said zone.

2. A method, as set forth in claim 1, wherein the polymerizable material comprises butadiene.

3. A method, as set forth in claim 1, wherein the polymerizable material comprises a butadiene and styrene mixture.

4. A method, as set forth in claim 1, wherein the polymerizable material is placed in the formation by passing said material downwardly through a well bore and outwardly through the formation.

5. A method, as set forth in claim 1, wherein the polymerizable material is maintained under polymerization conditions for a time sufficient to form a volume of popcorn polymer substantially not greater than the total effective porosity pore space of the zone portion desired to be restricted.

6. A method, as set forth in claim 1, wherein the polymerizable material is polymerized in caverns of the subterranean zone.

7. A method, as set forth in claim 1, wherein the polymerizable material is polymerized in fractures of the subterranean zone.

8. A method, as set forth in claim 1, wherein the polymerizable material has popcorn polymer particles mixed therewith, said particles being insoluble in the polymerizable material, characterized by swelling upon exposure to the polymerizable material and comprising a relatively large number of methylene groups.

9. A method, as set forth in claim 1, including mixing lost circulation materials with the polymerizable material.

10. A method, as set forth in claim 9, wherein the lost circulation materials are one of natural fibers, synthetic fibers, natural fibrous materials, synthetic fibrous materials, or mixtures thereof.

* * * * *